United States Patent
Gallant

(10) Patent No.: US 7,105,972 B2
(45) Date of Patent: Sep. 12, 2006

(54) CONTROLLER AND MAGNETICALLY DRIVEN WHEEL FOR USE IN A RADIAL/ROTARY PROPULSION SYSTEM

(76) Inventor: Raymond J. Gallant, 2432 Cleghorn St., Apt 201, Honolulu, HI (US) 96815

( * ) Notice: Subject to any disclaimer, the term of this patent is extended or adjusted under 35 U.S.C. 154(b) by 111 days.

(21) Appl. No.: 11/045,261

(22) Filed: Jan. 31, 2005

(65) Prior Publication Data
US 2005/0127767 A1    Jun. 16, 2005

Related U.S. Application Data

(63) Continuation-in-part of application No. 09/771,662, filed on Jan. 30, 2001, now Pat. No. 6,849,984, which is a continuation-in-part of application No. 09/265,847, filed on Mar. 10, 1999, now abandoned.

(60) Provisional application No. 60/103,898, filed on Oct. 13, 1998.

(51) Int. Cl.
H02K 1/27 (2006.01)
H02K 21/24 (2006.01)
H02K 31/00 (2006.01)

(52) U.S. Cl. ............... 310/178; 310/113; 310/156.32; 310/268; 310/68 B; 180/65.1; 180/65.5; 318/725; 318/498; 318/254; 318/140; 318/150

(58) Field of Classification Search ............ 310/178, 310/113, 68 B, 268, 156.32; 180/65.1, 65.5; 318/725, 498, 254, 140, 150
See application file for complete search history.

(56) References Cited

U.S. PATENT DOCUMENTS

| | | | | |
|---|---|---|---|---|
| 3,566,165 A * | 2/1971 | Thomas | | 310/67 R |
| 3,832,581 A * | 8/1974 | Hoffmann et al. | | 310/46 |
| 4,042,056 A * | 8/1977 | Horwinski | | 180/65.2 |
| 4,179,633 A * | 12/1979 | Kelly | | 310/80 |
| 4,211,945 A * | 7/1980 | Tawse | | 310/112 |
| 4,922,145 A * | 5/1990 | Shtipelman | | 310/49 R |
| 5,164,623 A * | 11/1992 | Shkondin | | 310/67 R |
| 5,179,307 A * | 1/1993 | Porter | | 310/68 B |
| 5,191,255 A * | 3/1993 | Kloosterhouse et al. | | 310/156.38 |
| 5,258,697 A * | 11/1993 | Ford et al. | | 318/498 |
| 5,330,026 A * | 7/1994 | Hsu et al. | | 180/181 |
| 5,428,282 A * | 6/1995 | Johnson | | 318/701 |
| 5,514,923 A * | 5/1996 | Gossler et al. | | 310/74 |
| 5,600,191 A * | 2/1997 | Yang | | 310/67 R |
| 5,719,458 A * | 2/1998 | Kawai | | 310/156.49 |
| 5,786,645 A * | 7/1998 | Obidniak | | 310/68 R |
| 6,323,576 B1* | 11/2001 | Applegate | | 310/268 |
| 6,392,370 B1* | 5/2002 | Bedini | | 318/140 |

(Continued)

*Primary Examiner*—Karl Tamai
(74) *Attorney, Agent, or Firm*—Siemens Patent Services

(57) ABSTRACT

The radial/rotary propulsion system of the present invention features a flywheel having concentric rings of permanent magnets attached to one or both sides or embedded into the flywheel. These permanent magnets interact with DC powered electromagnets which, when selectively energized, impart rotary motion to the flywheel. By arranging the permanent magnets in concentric rings, better control of both speed and torques may be obtained. In addition, in a regenerative mode, inertia of the flywheel is reconverted to electrical energy by either additional permanent magnet/coil combinations or through the switching of the electromagnet coils normally used for rotating the flywheel. A controller/sequencer constantly receives input signals for throttle, braking, flywheel rotational position, and battery level, and in response provides signals to control activation of electromagnets for drive, braking, and regeneration. As a flywheel accelerates or decelerates, the controller/sequencer constantly adjusts which electromagnets are to be energized, when, and for how long. Utilizing electromagnets with a range of different resistances provides additional flexibility.

20 Claims, 10 Drawing Sheets

U.S. PATENT DOCUMENTS 6,606,578 B1 * 8/2003 Henderson et al. ......... 702/145
6,630,806 B1 * 10/2003 Brits et al. .................. 318/439
6,849,984 B1 * 2/2005 Gallant ....................... 310/178
2005/0127767 A1 * 6/2005 Gallant ....................... 310/113

* cited by examiner

PERMANENT MAGNET
ELECTROMAGNET
FIG. 11
PERMANENT MAGNET
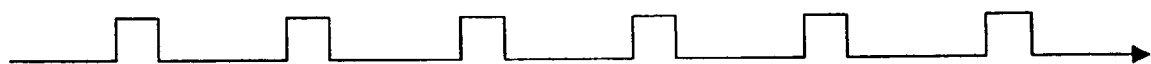
ELECTROMAGNET
FIG. 12

CONTROLLER AND MAGNETICALLY DRIVEN WHEEL FOR USE IN A RADIAL/ROTARY PROPULSION SYSTEM

REFERENCE TO RELATED APPLICATIONS

This application is a Continuation-in-Part of U.S. patent application Ser. No. 09/771,662, filed Jan. 30, 2001, now U.S. Pat. No. 6,849,984, which was in turn a Continuation-in-Part of abandoned U.S. patent application Ser. No. 09/265,847, filed Mar. 10, 1999, which was in turn a Continuation of U.S. Provisional Patent Application Ser. No. 60/103,898, filed Oct. 13, 1998.

FIELD OF THE INVENTION

The present invention relates to a magnetically driven flywheel or wheel and, more particularly, the invention features a flywheel equipped with rings of permanent magnets adapted to interact with external, DC, capacitive discharge powered electromagnets to rotate the flywheel. Energy recovery is by the inertia of the flywheel propelling embedded magnets in an axial flux array to generate electrical power to recharge a battery.

BACKGROUND OF THE INVENTION

A magnetic wheel drive is described in U.S. Pat. No. 4,179,633 for MAGNETIC WHEEL DRIVE; issued to Donald A. Kelly on Dec. 18, 1979. Kelly teaches a wheel having a series of permanent magnets radially disposed along its circumference. These permanent magnets are arranged to interact with a series of pairs of permanent magnets placed on oscillating, toggle bars powered by an external motive force. The "flipping" of the toggle bars alternately place the north and south poles of the magnet couples in close proximity to the permanent magnets on the wheel. By synchronizing the toggling of the fixed magnets, alternate north and south poles attract oncoming, rotating wheel magnets. By controlling the speed of the toggling, the rotational speed of the wheel may be controlled.

In contradistinction, the radial/rotary propulsion system of the instant invention requires no external, toggling of permanent magnet couples. Unlike KELLY, the inventive radial rotary propulsion system uses DC energized electromagnets in a repulsion only modality. The inventive apparatus uses permanent magnets on a flywheel in rings of varying diameters which, in turn, interact with selectively with the DC, capacitive discharge powered electromagnets on one or both sides of the rotating flywheel. The use of concentric rings of permanent magnets helps simplify the speed control of the device and allows more efficient operation over a range of torque requirements. In addition, when the flywheel is not being powered, the inertia of the flywheel allows generation of electrical power through the drive coils which may be used to recharge the battery normally used to power the electromagnets. This helps to re-energize the system so that it can be used for vehicle propulsion or in other similar applications, while decreasing the total drain from the battery system.

U.S. Pat. No. 5,600,191 for DRIVING ASSEMBLY FOR MOTOR WHEELS; issued Feb. 4, 1997 to Chen-Chi Yang, teaches another apparatus for magnetically imparting rotary motion to a wheel. Yang also uses permanent magnets radially arranged at the circumference of a stator (wheel) to interact with external electromagnet coils. A clutch mechanism is provided to selectively couple the rotary motion to an axle. The present invention, on the other hand, utilizes permanent magnets embedded in, or mounted on one or both faces of a flywheel and arranged in concentric rings of varying diameters which, in turn, interact with selectively energizable electromagnets, also arranged in concentric rings so as to interact with corresponding rings of permanent magnets on the flywheel. In the inventive radial/rotary propulsion system, magnetic interaction between the permanent and the electromagnets is always repulsive, unlike YANG who relies upon an arrangement of north-south poles to provide a attraction/repulsion mode of operation. Regenerative elements allow recapture of inertial energy of the flywheel for the purpose of recharging a battery.

In U.S. Pat. No. 5,719,458 for POWER GENERATOR WITH IMPROVED ROTOR; issued Feb. 17, 1998 to Teruo Kawal, another apparatus for imparting rotary motion to a wheel is described. KAWAL utilizes an AC current, preferably three-phase AC, to energize electromagnets to create an alternating magnetic field which interacts with semicircular pole pieces on the perimeter of the wheel. Unlike Applicant's nonmagnetic wheel, the KAWAL wheel is itself, a relatively complex magnetic structure. The KAWAL system relies upon an alternating north-south pole arrangement to implement an attraction/repulsion mode of operation. The present invention, on the other hand, utilizes a DC, capacitive discharge system to selectively energize the electromagnets which interact with concentric circles of permanent magnets, all having the same polarity within any given magnet ring, the inventive system operating in a repulsion only mode. Also, unlike the KAWAL pole pieces, the permanent magnets of the instant invention need have no special physical shape (i.e., they need not be semicircular, etc.).

While in each one of these prior art inventions, apparatus for imparting rotary motion to a wheel through the interaction of permanent magnets with a magnetic field from electromagnets is described, none of the above inventions and patents, taken either singly or in combination, is seen to describe the instant invention as claimed.

BRIEF SUMMARY OF THE INVENTION

The radial/rotary propulsion system of the present invention features a flywheel having concentric rings of permanent magnets attached to or embedded in one or both faces. These permanent magnets are arranged on the flywheel such that all magnets in a ring on a given face have the same polarity (i.e., they are all either North or South poles). The magnets interact with DC powered electromagnets which, when selectively energized, typically using capacitive discharge energization, to provide magnetic fields which impart rotary motion to the flywheel. By arranging the permanent magnets in concentric rings and using repulsion only operation, better control of both speed and output torque may be obtained. The use of narrow pulse width DC pulses, such as may be obtained from a capacitive discharge type power supply, also helps to control the inventive radial/rotary propulsion system and facilitates operation at high speed, for example at speed in the vicinity of 24,000 rpm. By using narrow, high-energy pulses, necessary energy for high-torque output may be obtained while still operating at high rotational rates. In addition, in a regenerative mode, inertia of the flywheel is reconverted to electrical energy by either additional permanent magnet/coil combinations, or through the switching of the electromagnet coils normally used for rotating the flywheel, or by alternators positioned on the flywheel housing and tensioned against the flywheel. The energy recapture feature is particularly useful when the flywheel is utilized in a self-propelled vehicle powered by self-contained, rechargeable batteries.

Activation or energization of electromagnets is controlled by a controller/sequencer. When in operation, the controller/sequencer constantly receives input from sensors that detect acceleration, braking, flywheel rotational position, and battery level. With this information, the controller/sequencer determines which electromagnets to energize or pulse when, and which electromagnets to utilize for regeneration of rotational energy into electrical energy and when to activate them. In drive mode, electromagnets are pulsed or energized after passage of a permanent magnet rotating on a flywheel, while in braking mode, electromagnets are pulsed or energized before passage of a permanent magnet rotating on a flywheel. Different electromagnets may have different resistances, resulting in different amperages, given a constant voltage. As a flywheel accelerates, the controller/sequencer changes the pulse width utilized to energize electromagnets, the timing of the pulses, and which electromagnets to energize, until the desired rotational speed is accomplished, at which time only enough electromagnet energizations are provided to maintain that rotational speed. The controller/sequencer also determines which electromagnets are utilized for regeneration and when.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 11 is a wave form illustrating the relationship between permanent magnet location and electromagnet energization during acceleration;

FIG. 12 is a wave form illustrating the relationship between permanent magnet location and electromagnet energization during braking.

DETAILED DESCRIPTION OF THE INVENTION

Figure 1:
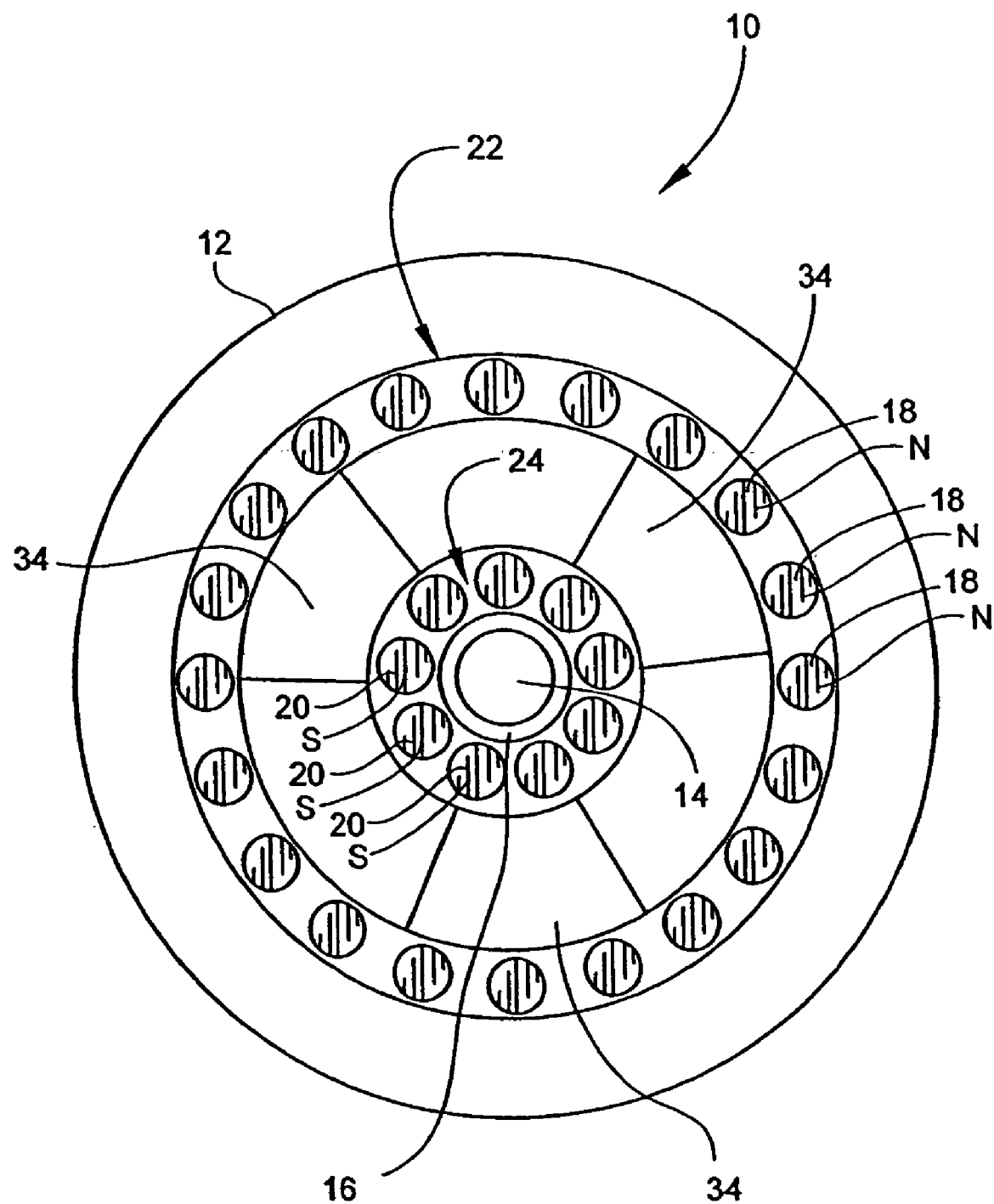
FIG. 1 is a plan view of the permanent magnet equipped flywheel of the invention.
Figure 2:
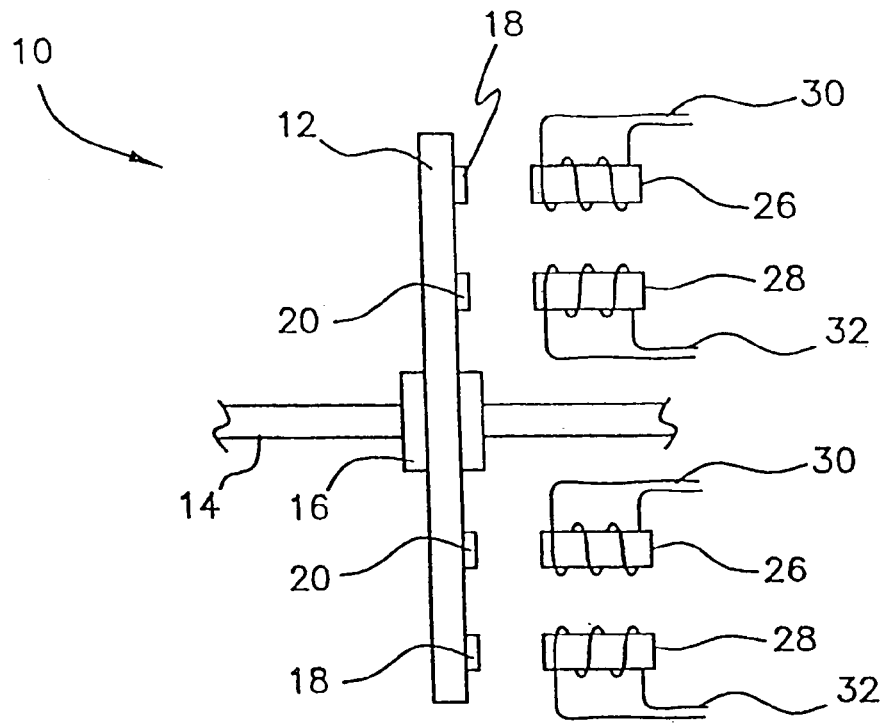
FIG. 2 is a side schematic of the radial/rotary propulsion system utilizing the flywheel shown in FIG. 1.

Referring first to FIGS. 1 and 2, there are shown a plan view and a side view, respectively, of a first embodiment of the radial/rotary propulsion system of the present invention, generally at reference number 10. A flywheel 12 is shown mounted on axle 14 through bearing assembly 16. Bearing assembly 16 is typically a non-magnetic one-way bearing to allow rotation of flywheel 12 in a single, predetermined direction and/or to allow coupling of the rotational motion of flywheel 12 to axle 14. Making bearing 16 a one-way bearing simplifies the electrical control (not shown) and guarantees rotation of flywheel 12 in a known direction at start-up. If a two-way bearing is used, an additional mechanism (not shown) for coupling the rotational motion of flywheel 12 to axle 14 must be provided. Such mechanisms are well known to those skilled in the art. Flywheel 12 is composed of a dense but magnetically nonconductive material. Brass, bronze, or certain nonmagnetic stainless steel alloys have been found suitable. A composite structure having a dense material such as lead bonded between structurally rigid plates could also be employed. The greater the mass of flywheel 12, the smoother the performance of the inventive radial/rotary propulsion system. Bearing assembly 16 allows flywheel 12 to rotate freely about axle 14 in a single, predetermined direction, assuming that bearing assembly 16 is a one way bearing. Alternatively, it could also be a magnetic bearing assembly. Permanent magnets 18, 20 are affixed to a side surface (i.e., face) of flywheel 12. Magnets 18, 20 may be affixed to flywheel 12 using a structural adhesive or any mechanical fastening means suitable to withstand the centrifugal forces to which the magnets 18, 20 are subjected. Such fastening means are well known to those skilled in the art. Magnets 18 are arranged in a substantially circular pattern at a first radius from the center of axle 14 forming a first magnet group 22. Likewise, magnets 20 are arranged in a substantially circular pattern at a second, smaller radius from the center of axle 14. Any number of magnets may be used in first magnet group 22 or second magnet group 24, although an even number is preferable, the magnets 18, 20 being arranged so that all magnets in magnet groups 22, 24 present the same polarity (i.e., the poles presented for interaction with external electromagnets are all are North poles or all are South poles). Permanent magnets 18, 20 are preferably spaced far enough apart around the face of flywheel 12 so as to provide a break, or a reduction in overlapping magnetic flux density, in the magnetic fields generated by adjacent magnets. If sufficient space is not provided, either the inventive system will not operate at all, or will operate inefficiently. Permanent magnets 18, 20 may be provided on one or both faces of flywheel 12.

Figure 6:
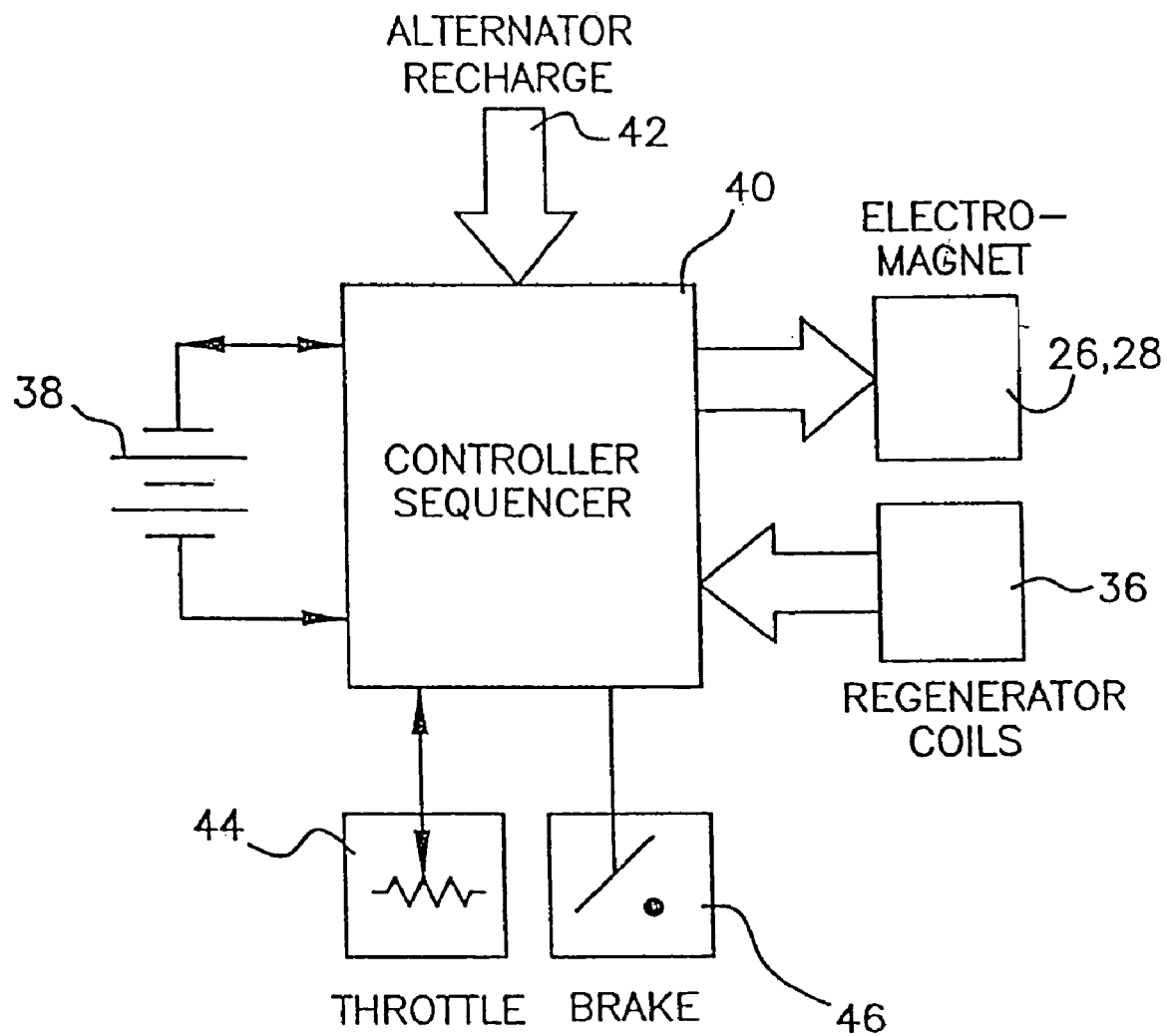
FIG. 6 is a system schematic block diagram of a control system for an electrically powered vehicle using the radial/rotary propulsion system of the invention.

A series of electromagnets 26, 28 are positioned with their poles as close as possible to the first magnet group 22 and second magnet group 24, respectfully. Electrical leads 30, 32 are connected to a controller/sequencer 40 (FIG. 6) which selectively applies power, generally from a capacitive discharge power supply circuit (not shown), typically forming a part of controller/sequencer 40. Power for electromagnets 26, 28 is provided by battery 38 (FIG. 6). By properly sequencing and controlling the pulse width and amplitude of the DC pulses applied to electromagnets 26, 28, the rotational speed and torque output from the radial/rotary propulsion system may be controlled. If a two-way (not one-way) bearing assembly 16 has been used, the direction of rotation may also be controlled. The use of short duration pulses facilitates high speed operation. By using a capacitive discharge type power supply, even with narrow pulses, enough energy may be imparted to the flywheel to maintain high torque output at these high operating speeds. Typically, parallel (i.e. front and back side of flywheel) magnets are pulsed simultaneously. This minimizes lateral thrust forces on bearing 16 and thereby prevents excessive wear on bearing 16 as well as minimizing friction among bearing 16, flywheel 12 and axle 14.

Figure 8:
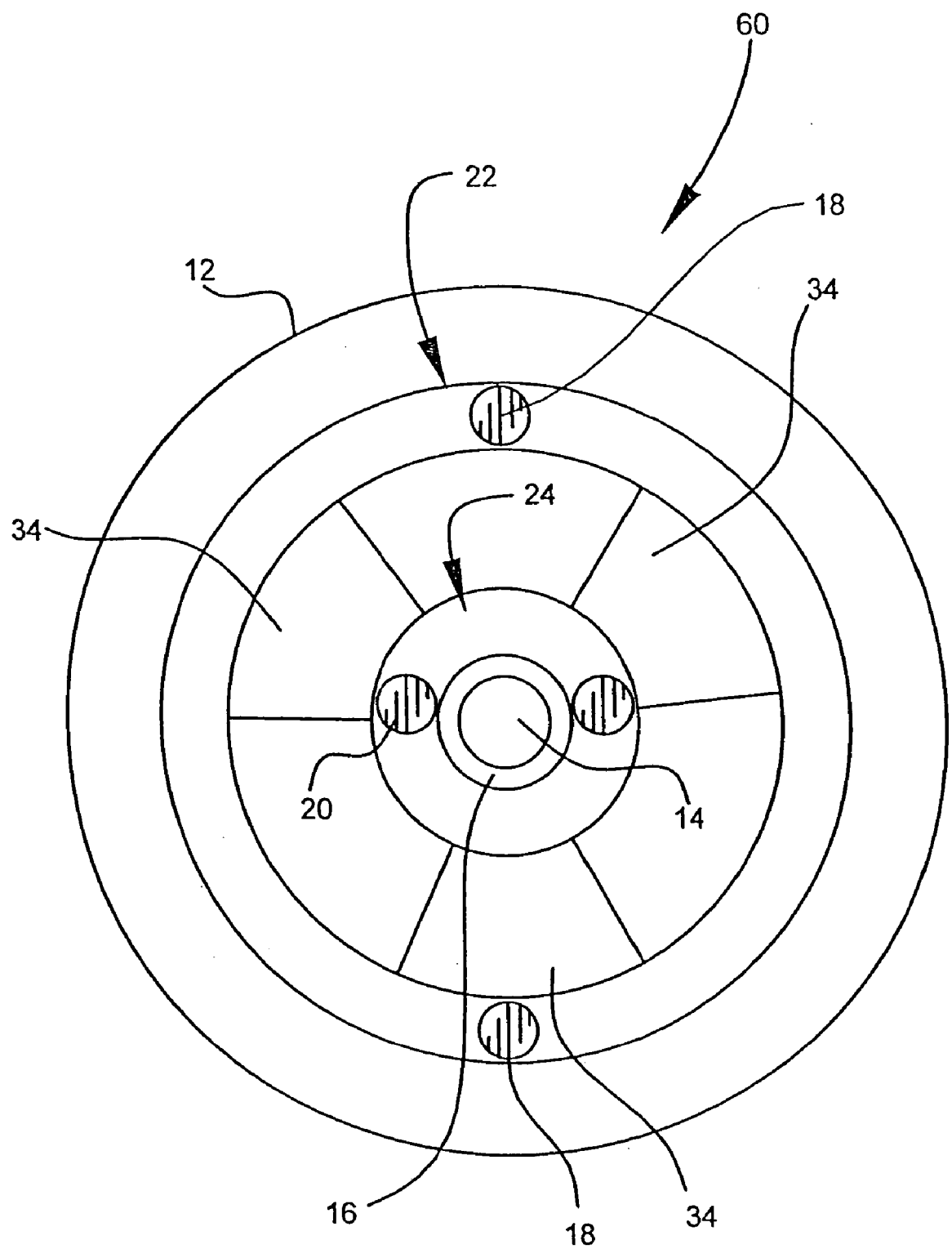
FIG. 8 is a schematic, plan view of an alternate, simplified embodiment of the magnet equipped flywheel shown in FIG. 2.

Referring now to FIG. 8, there is shown a plan view of a simplified embodiment of the present invention, generally at reference number 60. In this simplified embodiment, flywheel 12 is connected to axle 14 by means of bearing 16. Magnet group 22, however, consists of only two magnets 18, disposed on flywheel 12 diametrically opposed to one another. Likewise, magnet group 24 consists of only two magnets 18, also shown diametrically opposed to one another. While magnet groups 22 and 24 are depicted having an orthogonal relationship to one another, it should be obvious to those skilled in the art that any angular relationship between magnet groups 22 and 24 could be chosen to meet a particular operating requirement or circumstance. Likewise, a combination of the embodiment of FIGS. 1 and 2 with the embodiment of FIG. 8 could also be created. Such an embodiment (not shown) could have two magnets in magnet group 22 and a large number of magnets in magnet group 24, or vice-versa.

Referring now again to FIGS. 1 and 2, it is important that a spacing between individual magnets 18 and 20 be chosen so that any magnetic interference between adjacent magnets is held below a critical operating threshold. Failure to provide sufficient spacing between magnets 18, 20 may, worst case, prevent operation of the inventive propulsion system. If insufficient spacing is provided, the system may be partially operative but efficiency and/or range of control may suffer.

The radial/rotary propulsion system of the instant invention also features a regeneration system to recapture electrical energy from flywheel inertia during a coast (non driven) mode of operation. Typically the regeneration is implemented using separate components (i.e., magnets, pick-up coils, alternators, etc.) than those used to drive flywheel 12. This will be described in detail hereinbelow. It is possible, however, by using appropriate control circuitry (not shown), to utilize the drive components, particularly electromagnets 26, 28 so that when they are no longer operating in a driven mode, they may be used in a reverse process during a coast (non driven or recovery) mode of operation, to recapture the inertia of flywheel as electrical energy. The recaptured energy may be used to partially recharge battery 38 (FIG. 6). In one embodiment, permanent magnets 18 and/or 20 interact with electromagnets 26, 28, respectively, to act as a generator. This requires a special switching arrangement (not shown) in controller/sequencer 40 (FIG. 6) to accomplish this function. Such switching arrangements are well known to those in the electrical engineering arts and form no part of the instant invention. In alternate embodiments, additional magnets and coils, as are described in detail hereinbelow, may be used to perform the regeneration function.

Figure 3:
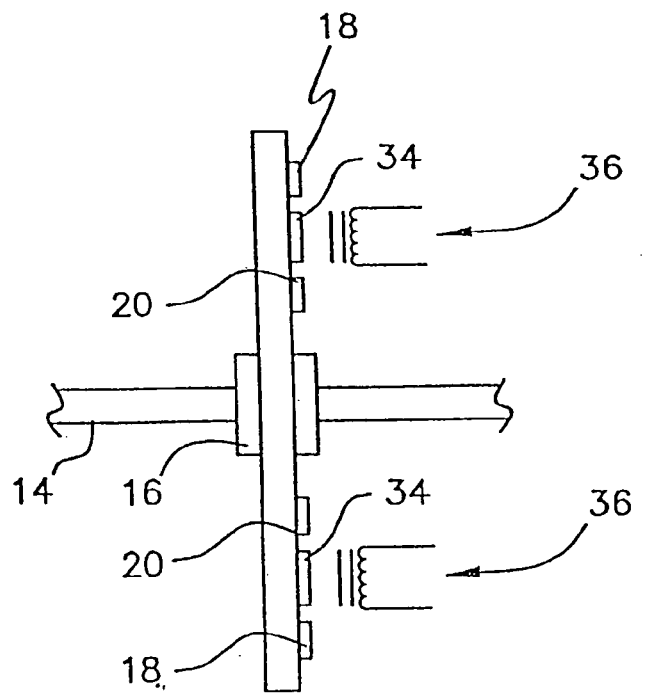
FIG. 3 is a side schematic of the radial/rotary propulsion system showing an energy recapture mechanism including alternators for electrical regeneration.

More typically, separate components are used to implement the regeneration mode. Referring now to FIG. 3, there is shown a schematic view of an alternate embodiment of the regeneration system. In this embodiment, an additional set of permanent magnets 34, also arranged in a substantially circular pattern, typically at a radius between the two radii associated with magnets 18 and 20, are also affixed to flywheel 20. Special alternator pick-up coils 36, optimized as electrical generating structures are deployed as nearly as possible to magnets 34. In this embodiment, no special switching arrangement of electromagnets 26, 28 is required and simple regeneration circuitry (not shown), well known to those skilled in the circuit design art, my be used. The regeneration circuit also serves as a brake for flywheel 12 because, as inertial energy is converted to electrical energy, the rotation of flywheel 12 is slowed and, ultimately, stopped. This is useful when the radial/rotary propulsion system of the invention is used to power a land vehicle by direct wheel power application. Energy which would normally be wasted may be scavenged by the regeneration system, thereby both saving wear on mechanical brakes and allowing a greater operating range for the vehicle between battery charges.

Figure 4:
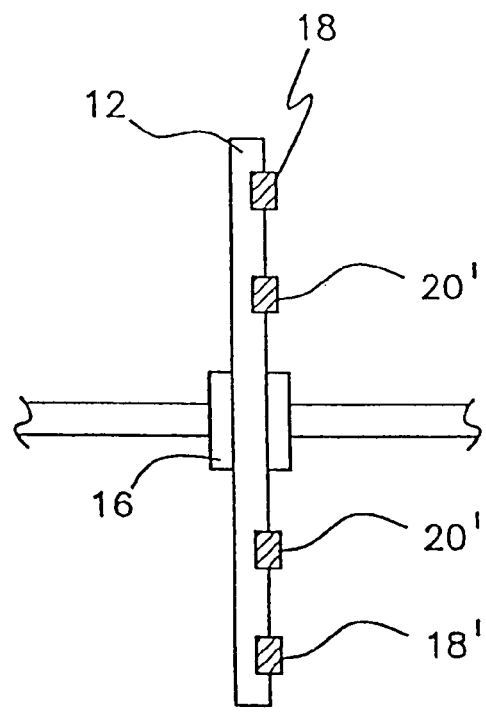
FIG. 4 is a side view of the permanent magnet equipped flywheel of the invention showing partially embedded magnets.

Referring now to FIG. 4, magnets 18', 20' are shown partially embedded in flywheel 12. This type of mounting arrangement provides a more secure containment of magnets 18', 20' than does simple surface mounting.

Figure 5:
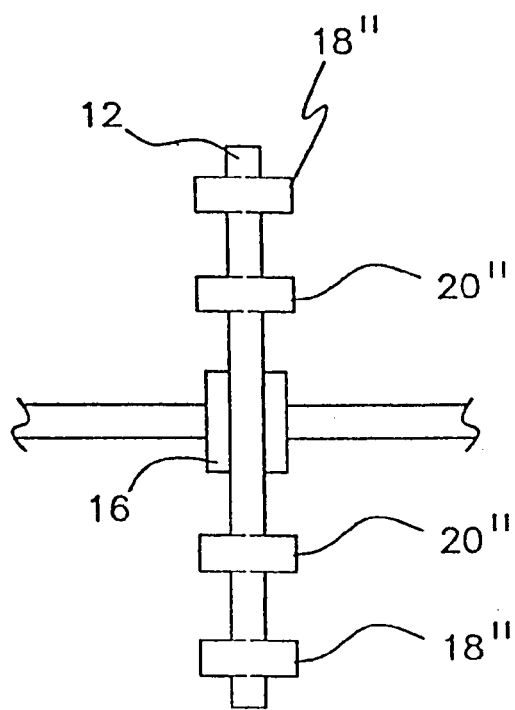
FIG. 5 is a side view of the permanent magnet equipped flywheel of the invention showing fully embedded magnets.

Referring now to FIG. 5, there is shown another embodiment of a magnet placement. Magnets 18" and 20" are shown extending completely through flywheel 12. Magnets 18', 20' (FIG. 4), 18" and 20" are shown projecting beyond the surface of flywheel 12. This is not necessary and, indeed, it may be preferable in some environments to keep the surfaces of magnets 18', 20', 18" and 20" flush with the surface of flywheel 12.

In operation, the placement of magnets in at least two concentric rings allows for excellent control of both velocity and torque from the radial/rotary propulsion system.

Referring now to FIG. 6, there is shown a system schematic block diagram of the instant invention. A rechargeable battery 38 is connected to a controller or sequencer (controller/sequencer) 40. Recharge power for battery 38 is applied to controller/sequencer 40 at recharge input (alternator) connection 42. Throttle 44 and brake 46 control signals are applied to controller/sequencer 40. It will be obvious to those skilled in the art that the throttle and brake signals may be generated by a wide variety of transducers known to those skilled in the art. In addition, it will be obvious to those skilled in the design of land vehicles that inputs other than throttle and brake may be required to make a fully functional vehicle control system. These inputs could readily be added to controller/sequencer 40, if required. Controller/sequencer 40 includes capacitive discharge circuits (not shown) which allow energy from battery 38 to relatively slowly charge one or more capacitors (not shown). When controller/sequencer 40 energized one or more electromagnets 26, 28, a high energy, short duration pulse may be provided to electromagnets 26, 28. Capacitive discharge circuits are also well known to those skilled in the electrical engineering arts. Controller/sequencer 40 provides a plurality of outputs to electromagnets 26, 28 (FIG. 2). There may be as many outputs from controller/sequencer 40 as there are electromagnets 26, 28, each electromagnet being individually controlled. In alternate embodiments, groups of electromagnets associated with each of the first magnet group 22 (FIG. 1) and/or the second magnet group 24 (FIG. 1) could be combined (i.e., multiple electromagnets in each group could be simultaneously energized) thereby reducing the number of switching components (not shown) within controller/sequencer 40 and simplifying the electromagnet wiring (not shown). Under most circumstances, electromagnets 26, 28 which correspond to magnets 18, 20 which are diametrically opposed, will be fired simultaneously. This practice tends to equalize lateral thrust stresses on bearing 16 (FIGS. 1 and 2) and tends to provide smoother control of the inventive system. It should, however, be obvious to those skilled in the motor control arts that alternate control arrangements could be provided to accommodate a particular operating circumstance or environment.

Figure 9:
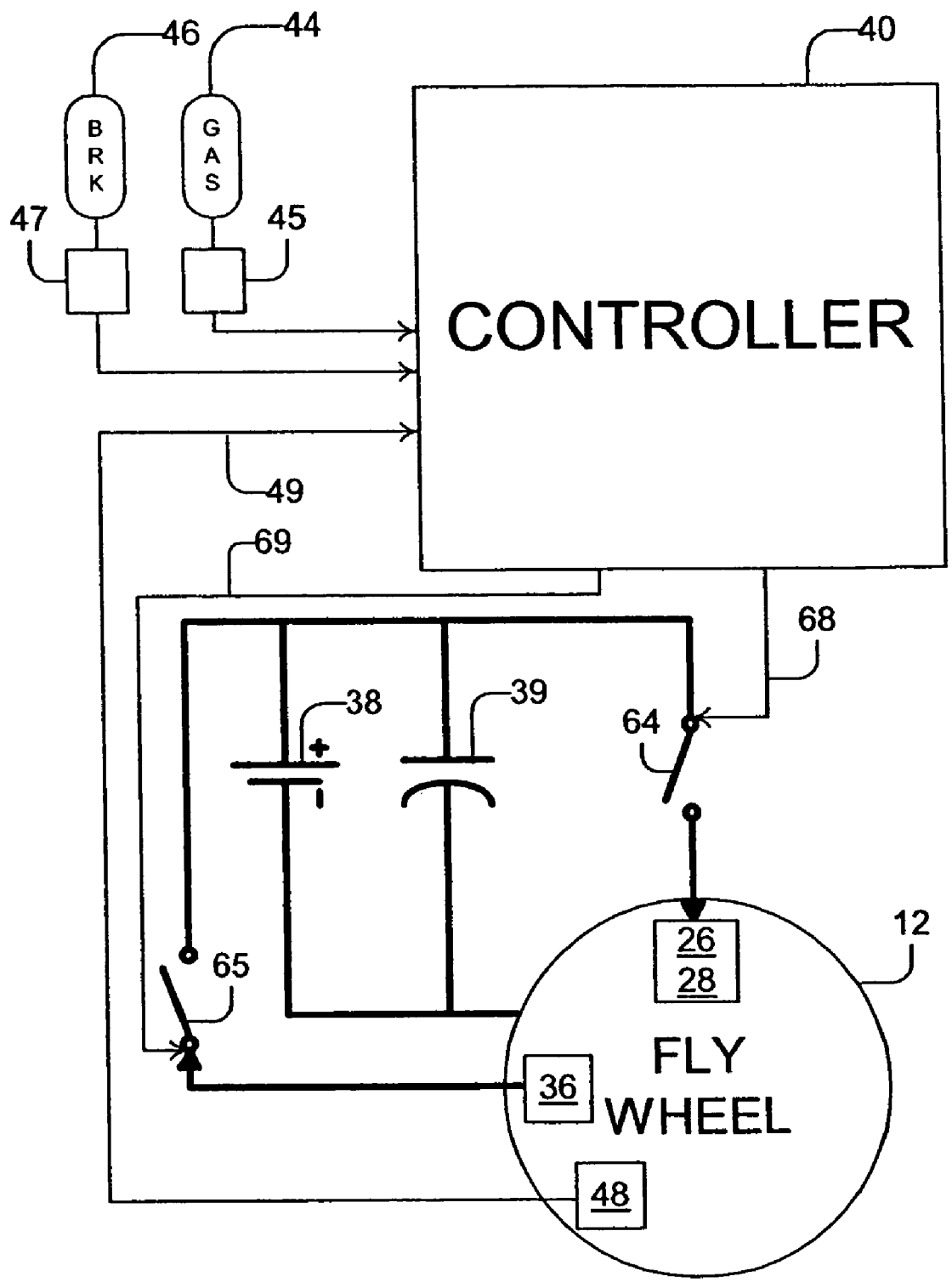
FIG. 9 is another view of the system schematic shown in FIG. 6 showing many of the same components as shown in FIG. 6.

FIG. 9 is another view of the system schematic shown in FIG. 6 showing many of the same components as shown in FIG. 6. A throttle or accelerator 44 mechanically actuates throttle transducer 45, which provides one set of input signals to the controller/sequencer 40. A brake 46 actuates brake transducer 47, which provides one set of input signals to the controller/sequencer 40.

Another set of input signals 49 to the controller/sequencer 40 are provided by a set of one or more flywheel position sensors 48. The flywheel position sensors 48 provide the controller/sequencer 40 information about the current rotational position of the flywheel 12. In a preferred embodiment, the flywheel position sensors 48 will utilize the Hall Effect to determine the current position of the flywheel 12 by detecting the rotation or passage of permanent magnets that induce current flow. In this embodiment, permanent magnets 18, 20 are utilized, and Hall Effect sensors are interspersed with electromagnets 28 or regeneration coils 36 in a corresponding circular array. However, other configurations are also within the scope of the present invention, including utilizing permanent magnets dedicated to Hall Sensors. Also, other means of detecting rotational position of the flywheel 12 are also within the scope of this invention, including optical and electromechanical means. Rotational speed and acceleration of the flywheel 12 can then be determined by the controller/sequencer 40 through multiple readings of the flywheel position sensors 48 over time.

The controller/sequencer 40 utilizes braking, throttle, and rotational position signals to determine which electromagnets 26, 28 to energize at what time, and when to activate regeneration. An illustrative power circuit is shown. A battery 38 provides power to recharge capacitors 39. The capacitors 39 then selectively provide power to electromagnets 26, 28 via gate 64 under control 68 of the controller/sequencer 40. The battery 38 is also selectively recharged by regeneration coils 36 via gate 65, again under control 69 of the controller/sequencer 40.

Figure 10:
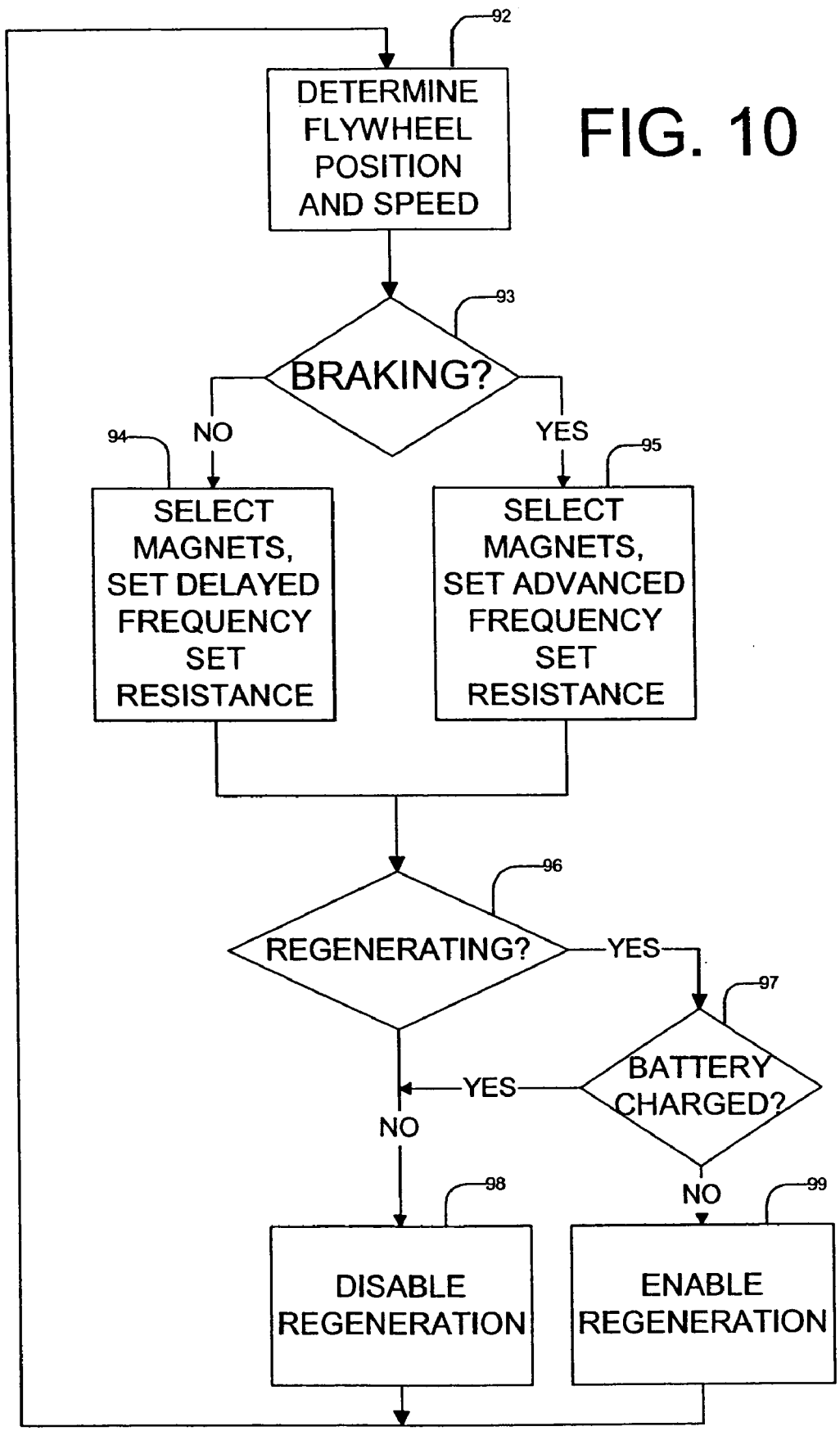
FIG. 10 is a flowchart illustrating operation of the controller/sequencer.

FIG. 10 is a flowchart illustrating operation of the controller/sequencer 40. A loop is entered, and the flywheel position is determined utilizing flywheel position sensor 48 signals 49, step 92. The rate of change of the flywheel position over time is utilized to determine flywheel velocity and acceleration or deceleration. Similarly, throttle 44 and brake 46 signals are received and evaluated. Utilizing this information, a decision is then made as to whether there is currently braking, step 93. This may be based on detecting depression of a brake pedal 46, reduced pressure on a throttle 44, or by other means. If braking 94, appropriate electromagnets 26, 28 are selected for energization prior to passage of the corresponding permanent magnets 18 (see FIG. 12), an energization pulse width, and electromagnetic resistance are determined. Otherwise, if not braking, step 94, appropriate electromagnets 26, 28 are selected for energization after passage of the corresponding permanent magnets 18 (see FIG. 11), an energization pulse width, and electromagnetic resistance are determined.

Regardless of whether or not there is braking, step 94, a determination is then made whether electricity is currently being regenerated, step 96. Regeneration may be utilized as part of a braking process. It may be utilized when coasting. It may even be utilized during acceleration, typically by selecting coils other than those used for drive. If regenerating, step 96, a test is then made whether or not the battery 38 is fully charged, step 97. If the battery 38 is not fully charged 97, regeneration is enabled, step 99, by selecting and activating regeneration coils 36. Otherwise, whether or not regenerating, step 96, or the battery is fully charged, step 97, regeneration is disabled, step 98, by deactivating regeneration coils 36. It should be noted that this is exemplary, and other means of enabling and disabling regeneration are also within the scope of this invention. Typically, the controller/sequencer 40 then repeats the loop, again determining flywheel location, step 92.

In some embodiments of the present invention, regeneration utilizes the same electromagnets as does acceleration and braking, through switching of the coils utilized in the electromagnets, while in other embodiments, dedicated electromagnets are utilized, and in others, a combination of all of the above. Also, as can be seen from FIGS. 10 and 11, braking is typically performed by supplying a pulse to electromagnets before the passage of permanent magnets and acceleration is typically performed by supplying a pulse to electromagnets after the passage of permanent magnets. Regeneration is typically performed by capturing energy during the passage of permanent magnets by electromagnets. Thus, through switching of electromagnet coils to/from pulse from/to regeneration, it is also envisioned in some embodiments that acceleration and regeneration or braking and regeneration functionality can be combined in the same electromagnetic coils through switching.

It should be understood that this method is exemplary only. The actual algorithm utilized will be to a great extent determined by the type of controller/sequencer 40 selected. Typically, a controller/sequencer 40 will be a Digital Signal Processor (DSP) microcontroller or an embedded microprocessor. Other types of controller/sequencers 40 are also within the scope of this invention. An engineer, reasonably skilled in this area of practice, will be able to implement the methodology shown in this FIG. without undue experimentation, making appropriate allowances and changes based on which type of controller/sequencers 40 selected.

FIG. 11 is a wave form illustrating the relationship between permanent magnet 18 location and electromagnet 28 energization during drive or acceleration (step 94 in FIG. 10). The passage of a permanent magnet 18 by the electromagnet 28 is indicated by a square wave. This will typically be computed from the flywheel position and speed (step 92 in FIG. 10), based on input signals from flywheel position sensors 48. In this illustration, every other time that a permanent magnet 18 passes by an electromagnet 28, the electromagnet 28 is energized, illustrated by a square wave. Energizing electromagnets 28 after passage of permanent magnets 28 is done here since, in this invention, the electromagnets 28 and permanent magnets 18 are the same polarity, resulting in magnet repulsion. Thus, acceleration is accomplished by electromagnets 28 pushing against permanent magnets 18, based on this magnetic repulsion. The pulse width for energizing electromagnets 28 is typically determined based on rotational speed of the flywheel 12. At a minimum, it is preferable that the magnetic field from energizing an electromagnet 28 have significantly died out before possibly interacting with the magnet field of the next permanent magnet 18 rotating by that electromagnet 28.

This FIG. illustrates energizing an electromagnet 28 after every other passage of a permanent magnet 18. However, this is illustrative only. Since the controller/sequencer 40 is preferably microcontroller or microprocessor based, when to energize or pulse which electromagnet 28 is programmable, and thus totally flexible. In a preferred embodiment, the frequency of electromagnet 28 energization will decrease as the speed of the flywheel 12 increases. Also, acceleration will also help determine frequency of energization—the faster the desired acceleration, typically the more frequent the electromagnet 28 energization. When the flywheel 12 approaches the desired revolution speed, the frequency of energization will drop off, preferably to a minimum frequency to maintain this desired rotational speed.

Finally note that in this FIG., electromagnets 28 are energized every other time a permanent magnet 18 rotates by them. This is illustrative only. In this invention, more complicated orderings are also possible. In particular, one way to view electromagnet 28 energization is by rotational degree. Thus, if a flywheel has four permanent magnets 18 in a ring or circle, the permanent magnets 18 are separated by 90° of rotation. If an electromagnet 28 is energized for every other rotation of a permanent magnet 18 by that electromagnet 28, energization can be seen to be every 180° of rotation. This can be increased by 90° increments indefinitely. Thus, a given electromagnet 28 may be energized in the following sequence 90°, 90°, 90°, 180°, 180°, 270°, 360°, 480°, 720°, 1080°, etc. Another sequence may be 90°, 180°, 270°, 360°, 450°, 480°, etc.

What is not shown here is that there are typically multiple electromagnets 28 spaced evenly around a ring or circle to drive the permanent magnets 18 on a flywheel 12. Each electromagnet 28 can be, and preferably is, individually pulsed or energized by the controller/sequencers 40. This provides added flexibility when combined with a programmable controller/sequencers 40. However, preferably electromagnets 28 are energized in pairs on opposite sides of the flywheel 12 in order to minimize lateral forces on the flywheel. In one embodiment, opposite pairs of electromagnets 28 are energized in pairs on each side of a flywheel 12 at the same time, thus resulting in sets of four electromagnets 28 being energized together. Thus, if pairs of electromagnets 28 at the top of the assembly are energized, the corresponding pairs of electromagnets 28 at the bottom are also energized at the same time. Energizing all four of these electromagnets 28 at the same time balances the forces applied to the flywheel 12, resulting in lower friction, less wear, and higher potential rotating speeds. Other energization sequences are also within the scope of this invention.

FIG. 12 is a wave form illustrating the relationship between permanent magnet 18 location and electromagnet 28 energization during braking or deceleration (step 95 in FIG. 10). The passage of a permanent magnet 18 by the electromagnet 28 is indicated by a square wave. This will typically be computed from the flywheel location and speed (step 92 in FIG. 10), based on input signals 49 from flywheel position sensors 48. This differs from the previous FIG. illustrating acceleration, in that, during braking or deceleration, energization of electromagnets 28 precedes passage of permanent magnets 18. Thus, again using magnetic repulsion, braking is accomplished by pushing against rotationally upcoming permanent magnets 18 having the same polarity as the electromagnets 28. Again, the use of microprocessors or microcontrollers for a controller/sequencer 40 provides almost unlimited flexibility in sequencing electromagnetic 28 energizations.

Figure 13:
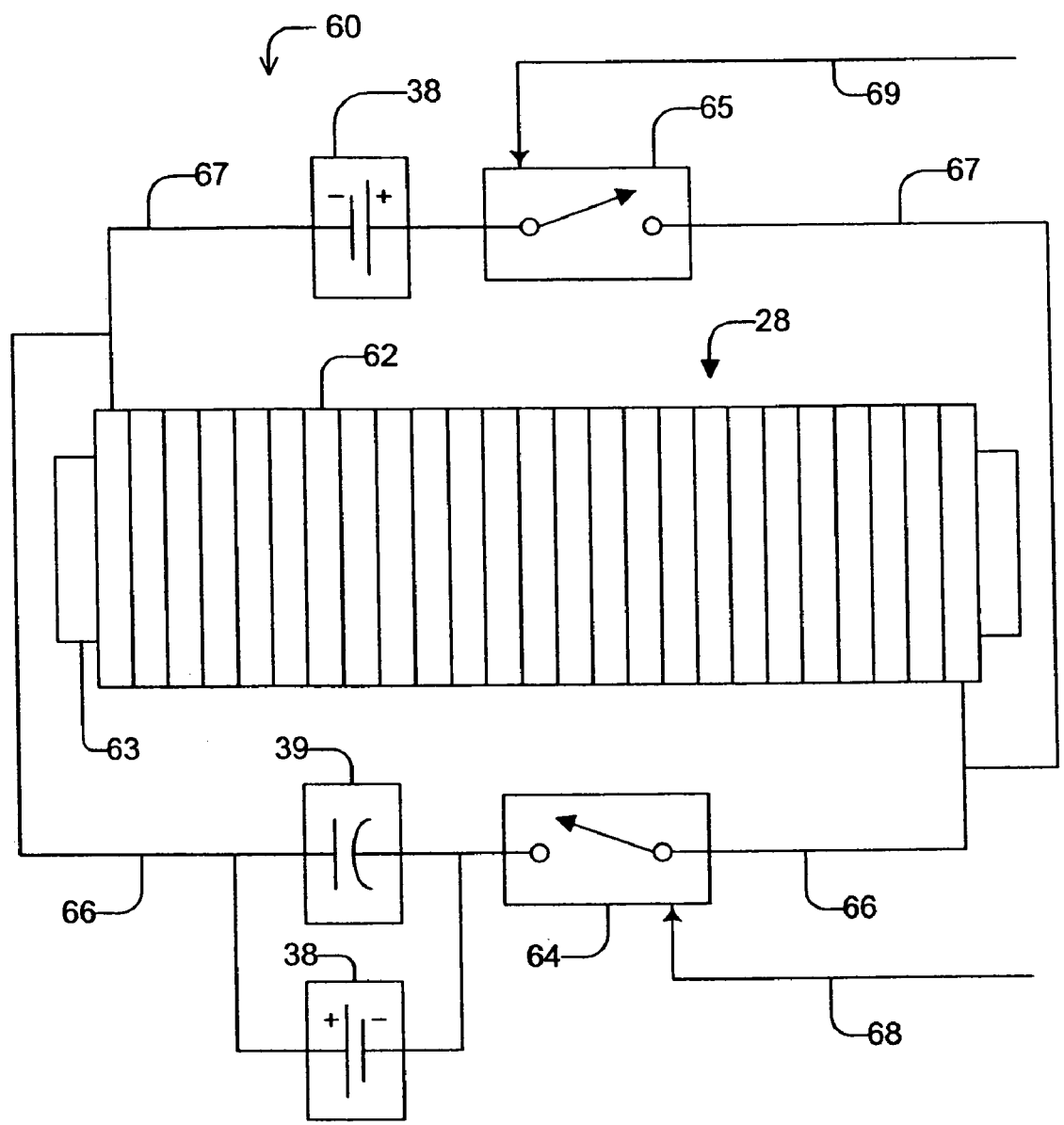
FIG. 13 is a circuit diagram illustrating activation of electromagnets in either pulse or regeneration mode.

FIG. 13 is a circuit diagram 60 illustrating activation of electromagnets 28 in either pulse (energization) or regeneration mode. An electromagnet 28 typically comprises a core 63 wrapped by a coil of wire 62. The amount or length of wire in the coil 62 typically determines the amount of resistance of the electromagnet 28. In pulse mode, utilized for drive (acceleration) or braking (deceleration), capacitors 39, recharged by battery 38, are coupled 66 via a switch 64, to an electromagnet 28 to energize the electromagnet 28 in order to provide an electromagnetic pulse. The switch 64 is controlled by signals 68 from the controller/sequencer 40. In regeneration mode, utilized to recapture flywheel inertial energy into electronic energy, the battery 38 is coupled 67 via a switch 65 to the electromagnet 28 to regenerate electricity into the battery 38. The switch 65 is controlled by signals 69 from the controller/sequencer 40. This FIG. is illustrative only. An engineer reasonably skilled in the applicable arts will typically implement this circuitry as required for his specific implementation.

The preferred embodiment of the present invention utilizes two groups of permanent magnets 18", 20" embedded in the flywheel 12 (see FIG. 5). Both groups are embedded in and extend through the flywheel 12, presenting one polarity (e.g. North) on one side of the flywheel 12, and the opposite polarity (e.g. South) on the other side of the flywheel 12. Each of the two groups of permanent magnets 18", 20" is positioned in a ring or circle, with the center of each of the two rings being the center of the flywheel 12 or axle 14. The inner ring of permanent magnets 20" comprises four cylindrical magnets evenly spaced around the inner ring, with all such permanent magnets 20" emplaced around and embedded in and through the flywheel 12 so as to each have the same, or a uniform, polarity (e.g. North) on one side of the flywheel 12, and the opposite polarity (e.g. South) on the second, opposing, side of the flywheel 12. The outer ring of permanent magnets 18" comprises eight magnets evenly emplaced around and embedded in and through the flywheel 12 so as to each have the same, or a uniform, polarity (e.g. North) on one side of the flywheel 12, and the opposite polarity (e.g. South) on the second, opposing, side of the flywheel. Note that in this example, all permanent magnets 18", 20" are shown with one uniform polarity ("North") on one side of the flywheel 12, and the other polarity ("South") on the other side. This is illustrative only. The polarity between groups of permanent magnets 18", 20" may vary between groups instead, such that the inner group of permanent magnets 20" has one uniform polarity (e.g. North) on one side of the flywheel 12, while the outer group of permanent magnets 18" has the other uniform polarity (e.g. South) on that side.

Also in the preferred embodiment of the present invention, electromagnets 26, 28 are mounted in rings proximate to the two rings of permanent magnets 18", 20", on each side of the flywheel 12 so as to provide drive or braking, when pulsed, and/or to provide recapture of electronic energy through regeneration. Thus, there are two rings of electromagnets 26, 28 on each side of the flywheel, for a total of four rings or groups of electromagnets. The electromagnets 28 in the inner ring of electromagnets are primary utilized for drive and braking, but may also be utilized for regeneration. The electromagnets 26 in the outer ring are primarily utilized for regeneration. The inner rings of electromagnets 28 each comprise eight electromagnets of varying resistance evenly spaced in a circle with a center corresponding to the center of the flywheel 12 or axle 14. The outer rings of electromagnets 26 each comprise sixteen electromagnets of identical resistance evenly spaced in a circle with a center corresponding to the center of the flywheel 12 or axle 14. All of the permanent magnets 18", 20" and electromagnets 26, 28 are mounted perpendicular to the surface of the flywheel 12.

In this embodiment of the present invention, the electromagnets 28 mounted in each of the two inner rings (one of each side of the flywheel) are of various resistances, ranging from 1 Ω (ohm) down to 0.3 Ω, in steps or increments of 0.1 Ω. In the preferred embodiment, the battery 38 provides twelve volts (V) of power. With Ohm's law, since V=IR, and, thus, I=V/R, this results in a range of amperage (A) from 12 amps (for 1 Ω) up to 40 amps (for 0.3 Ω). This configuration can run the full gamut of ohmic resistance. Both pulse width of the power provided to the electromagnets and amperage, through selection of which electromagnets to energize, for how long, and when, are adjusted as the speed of the flywheel increases during operation. Corresponding electromagnets on each side of the flywheel preferably have the same resistance and are pulsed simultaneously in parallel in order to minimize transverse forces on the flywheel and axle that would result from energizing them separately.

One pair of electromagnets 28 may be pulsed or energized at one time. Alternatively, up to four pairs of the electromagnets 28 in the inner ring may be pulsed or energized at the same time, corresponding to the four permanent magnets 20" mounted and embedded in the flywheel 12. On the other hand, pairs of electromagnets 28 not being pulsed or energized for drive or braking, may sometimes be utilized for regeneration. Thus, at one point in time, two pairs of electromagnets 28 may be utilized for drive or braking, while two others utilized for regeneration. At a different point in time, one pair could be utilized for drive or braking, while three pairs are utilized for regeneration. Then, at still another time, one pair could be utilized for drive or braking, while no pairs are utilized for regeneration. This decision of which electromagnets 28 to utilize for which purpose is controlled by the controller/sequencer 40.

Figure 7:
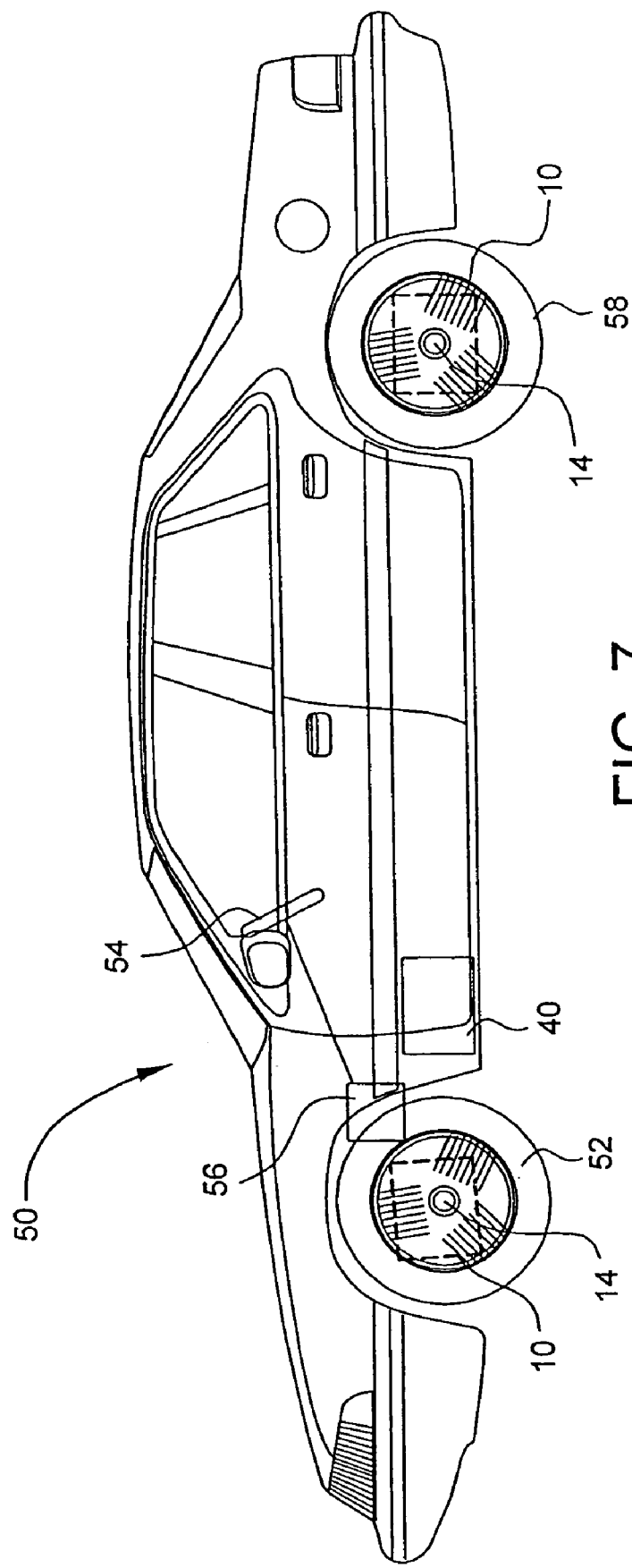
FIG. 7 is a schematic view of an electrically powered vehicle utilizing the radial/rotary propulsion system of the invention for the drive wheels.

Referring now to FIG. 7, there is shown a schematic of a typical electrically powered vehicle, reference number 50. The vehicle 50 chosen for purposes of disclosure is equipped with four wheels. It should be obvious that the radial/rotary propulsion system of the invention could readily be applied to many different vehicle configurations from a unicycle to a multi-wheeled transport vehicle. Front wheels 52, each equipped with a radial/rotary propulsion system, are coupled to a steering wheel 54 by means of steering box 56. Vehicle 50 is also equipped with a pair of rear wheels 58 which may also be equipped with the radial/rotary propulsion system of the instant invention. In still other embodiments, four wheel drive could be provided, front and rear wheel being independently equipped with the radial/rotary propulsion system of the present invention. In alternate embodiments, only rear wheels 58 may be equipped with the radial/rotary propulsion systems. In still other embodiments, the vehicle could remain essentially conventional and only the engine be eliminated and replaced with a radial, rotary propulsion system mounted to the transmission. Controller/sequencer 40 is shown located in the front of vehicle 50 but could readily be located any convenient place within the body of vehicle 50. Battery 38 (FIG. 6) has not been shown in vehicle 50. In common practice, battery 38 is made from multiple cells of the lead/acid type which many be distributed through the vehicle as required for good weight distribution and acceptable body styling.

This FIG. shows front wheels controlled by a steering box. However, in an alternate embodiment, steering is partially, or totally, controlled through applying different drive or braking to rotary propulsion systems mounted on two or more wheels, similarly as is typically done with tracked vehicles. Also, in FIG. 9 are shown throttle 44 and brake 46 pedals as are typically utilized today in many land vehicles today, such as automobiles. However, other methods of indicating throttle, braking, and steering are also within the scope of this invention, including use of hand controls, such as a joy stick for steering and a hand throttle. Also, the brake pedal 46 in FIG. 9 is shown providing input signals to the controller/sequencer 40. In some embodiments, braking will be done entirely by mechanical means, as is currently done in many land vehicles today, such as automobiles. In other embodiments, braking is done by electromagnetic means under control of the controller/sequencer 40, utilizing both active pulsing of electromagnets (see FIG. 12) and/or regeneration. In a preferred embodiment, braking utilizes both mechanical and electromagnetic means, with mechanical braking providing additional safety in the case of loss of electrical power.

It should be obvious that in alternate embodiments, electromagnets could be deployed on or in the flywheel in concentric, circular patterns and permanent magnets could be located adjacent the flywheel. Power to the electromagnets could be provided through slip rings or in other manners well known in the art.

It is to be understood that the present invention is not limited to the embodiments described above, but encompasses any and all embodiments within the scope of the following claims.

What is claimed is:

1. A radial/rotary propulsion system, comprising:
   a) a single flywheel comprising non magnetic material, having an axis of rotation, a first face and an opposing second face;
   b) a first group of permanent magnets, comprising a first plurality of permanent magnets mounted with a first uniform polarity on at least the first face of the flywheel in a first circular array disposed concentrically around the axis of rotation at a predetermined first radius;
   c) a first group of electromagnets disposed proximate the first face of the flywheel to selectively repel each one of the first group of permanent magnets;
   d) a means for sensing a position of the flywheel; and
   e) a controller/sequencer adapted to selectively apply DC power to the electromagnets of the first group of electromagnets to induce a rotation of the flywheel selectively at variable torques and speeds in at least a first direction of rotation entirely through repulsion of the first group of permanent magnets by at least one of the first group of electromagnets, wherein the rotation of the flywheel is induced by the controller/sequencer performing steps comprising:
   1) determining a current speed and position of the flywheel from a set of signals from the means for sensing the position of the flywheel;
   2) selecting a first selected electromagnet as a first one of the first group of electromagnets to energize, a first time in a rotation of the flywheel at which to energize the first selected electromagnet, and a first pulse width at which to energize the first selected electromagnet, wherein the first time is determined to be after passage of a first one of the first group of permanent magnets by the first selected electromagnet; and
   3) providing a signal to energize the first selected electromagnet at the first time for the first pulse width.

2. The radial/rotary propulsion system as recited in claim 1 wherein:

the means for sensing the position of the flywheel comprises a Hall Effect sensor.

3. The radial/rotary propulsion system as recited in claim 1 wherein the steps performed by the controller/sequencer further comprise:
    4) providing a signal to energize a second selected electromagnet at the first time.

4. The radial/rotary propulsion system as recited in claim 3 wherein:
    the radial/rotary propulsion system further comprises:
        f) a second group of permanent magnets, comprising a second plurality of permanent magnets mounted with a second uniform polarity on the opposing second face of the flywheel in a second circular array disposed concentrically around the axis of rotation at the predetermined first radius of magnitude; and
        g) a second group of electromagnets disposed proximate the opposing face of the flywheel to selectively interact with each one of the second group of permanent magnets, and
    the second selected electromagnet is a one of the second group of electromagnets.

5. The radial/rotary propulsion system as recited in claim 3 wherein:
    the first group of permanent magnets are embedded in and mounted to extend through the flywheel, wherein each of the first group of permanent magnets provides the first uniform polarity on the first face of the flywheel and a second uniform polarity on the opposing second face of the flywheel;
    the radial/rotary propulsion system further comprises:
        f) a second group of electromagnets disposed proximate to the opposing second face of the flywheel to selectively interact with each one of the first group of permanent magnets on the opposing second face of the flywheel by providing the second uniform polarity; and
    the second selected electromagnet is one of the second group of electromagnets.

6. The radial/rotary propulsion system as recited in claim 1 wherein:
    a first one of the first group of electromagnets has a first resistance and a second one of the first group of electromagnets has a second resistance different than the first resistance.

7. The radial/rotary propulsion system as recited in claim 6 wherein:
    the first one of the first group of electromagnets is selected as the first selected electromagnet when a rotational speed of the flywheel is determined to be slower and the second one of the first group of electromagnets is selected as the first selected electromagnet when the rotational speed of the flywheel is determined to be faster.

8. The radial/rotary propulsion system as recited in claim 1 wherein
    the radial/rotary propulsion system further comprises:
    regeneration means for converting inertial energy of the flywheel into electrical energy; and
    the steps performed by the controller/sequencer further comprise:
        4) activating a second selected electromagnet for regeneration of electricity utilizing the regeneration means.

9. The radial/rotary propulsion system as recited in claim 8, wherein:
    the second selected electromagnet is a second one of the first group of electromagnets.

10. The radial/rotary propulsion system as recited in claim 8, wherein:
    the radial/rotary propulsion system further comprises
        f) a second group of permanent magnets, comprising a second plurality of permanent magnets mounted with a second uniform polarity on the first face of the flywheel in a second circular array disposed concentrically around the axis of rotation at a predetermined second radius of magnitude different than that of the first radius; and
        g) a second group of electromagnets disposed proximate to the first face of the flywheel to selectively interact with each one of the second group of permanent magnets; and
    the second selected electromagnet is one of the second group of electromagnets.

11. A radial/rotary propulsion system, comprising:
    a) a flywheel rotatably affixed to an axle, the flywheel having a first face and an opposing second face;
    b) a first plurality of permanent magnets embedded in and mounted to extend through the flywheel, are mounted in a first substantially concentric circle, and provide a first uniform polarity on the first face of the flywheel and a second uniform polarity on the opposing second face of the flywheel, the first substantially concentric circle also being essentially concentric with the axle;
    c) a first plurality of electromagnets, disposed adjacent to the first face of the flywheel and adapted to selectively interact with each of the first plurality of permanent magnets in a manner which selectively repels each of the first plurality of permanent magnets, thereby imparting rotary motion to the flywheel relative to the axle during a drive mode of operation;
    d) a second plurality of electromagnets, disposed adjacent to the opposing second face of the flywheel and adapted to selectively interact with each of the first plurality of permanent magnets in a manner which selectively repels each of the first plurality of permanent magnets, thereby imparting rotary motion to the flywheel relative to the axle during a drive mode of operation;
    e) a means for sensing a position of the flywheel; and
    f) a controller/sequencer adapted to selectively apply DC power to each of the first plurality of electromagnets and to each of the second plurality of electromagnets to induce a rotation of the flywheel selectively at variable torques and speeds in at least a first direction of rotation entirely through repulsion of the first plurality of permanent magnets by at least one of the first group of electromagnets and by at least one of the second group of electromagnets, wherein the rotation of the flywheel is induced by the controller/sequencer performing steps comprising:
        1) determining a current speed and position of the flywheel from a set of signals from the means for sensing the position of the flywheel;
        2) selecting a first selected set of electromagnets comprising a first one of the first plurality of electromagnets to energize and a first one of the second plurality of electromagnets to energize, a first time in a rotation of the flywheel at which to energize the first selected set of electromagnets, and a first pulse width at which to energize the first selected set of electromagnets, wherein the first time is determined to be after passage of at least one of the first plurality of permanent magnets by the first selected set of electromagnets; and 3) providing a signal to energize the first selected set of electromagnets at the first time for the first pulse width.

12. The radial/rotary propulsion system as recited in claim 11 wherein:
a first one of the first plurality of electromagnets has a first resistance and a second one of the first plurality of electromagnets has a second resistance different than the first resistance; and
a first one of the second plurality of electromagnets has the first resistance and a second one of the second plurality of electromagnets has the second resistance.

13. The radial/rotary propulsion system as recited in claim 12 wherein:
the first one of the first group of electromagnets and the first one of the second group of electromagnets are selected as the first selected set of electromagnets when a rotational speed of the flywheel is determined to be slower and the second one of the first group of electromagnets and the second one of the second group of electromagnets are selected as the first selected set of electromagnets when the rotational speed of the flywheel is determined to be faster.

14. The radial/rotary propulsion system as recited in claim 11 wherein
the radial/rotary propulsion system further comprises:
regeneration means for converting inertial energy of the flywheel into electrical energy;
the steps performed by the controller/sequencer further comprise:
4) activating a second selected set of electromagnets for regeneration of electricity utilizing the regeneration means; and
the second selected set of electromagnets comprises a second one of the first plurality of electromagnets and a second one of the second plurality of electromagnets.

15. The radial/rotary propulsion system as recited in claim 11 wherein:
the radial/rotary propulsion system further comprises:
g) regeneration means for converting inertial energy of the flywheel into electrical energy;
h) a second plurality of permanent magnets embedded in and mounted to extend through the flywheel, are mounted in a substantially concentric circle, and provide a first uniform polarity on the first face of the flywheel and a second uniform polarity on the opposing second face of the flywheel, the second concentric circle also being essentially concentric with the axle and having a radius different than a radius of the first concentric circle;
i) a third plurality of electromagnets, disposed adjacent to the first face of the flywheel and adapted to selectively interact with each of the second plurality of permanent magnets in a manner which selectively repels each of the second plurality of permanent magnets, thereby converting inertial energy of the flywheel into electrical energy; and
j) a fourth plurality of electromagnets, disposed adjacent to the opposing second face of the flywheel and adapted to selectively interact with each of the second plurality of permanent magnets in a manner which selectively repels each of the second plurality of permanent magnets, thereby converting inertial energy of the flywheel into electrical energy; and
the steps performed by the controller/sequencer further comprise:
4) activating a second selected set of electromagnets for regeneration of electricity utilizing the regeneration means, wherein the second selected set of electromagnets comprises a first one of the third plurality of electromagnets and a first one of the fourth plurality of electromagnets.

16. An electrically powered land vehicle, comprising:
a) a wheel equipped with a radial/rotary propulsion system comprising a flywheel rotatably affixed to an axle, the flywheel having a first face and an opposing second face;
b) a first plurality of permanent magnets fixedly attached to the first face of the flywheel in a first substantially concentric circle essentially concentric with the axle, and mounted with a first uniform polarity;
c) a first plurality of electromagnets, adjacent the flywheel, adapted to selectively interact with the first plurality of permanent magnets in a manner utilizing selective magnetic repulsion of the first plurality of permanent magnets, thereby imparting rotary motion to the flywheel relative to the axle, thereby defining a drive mode of operation during which time the vehicle is propelled in a predetermined direction;
d) a means for sensing a position of the flywheel; and
e) a controller/sequencer adapted to selectively apply DC power to each of the first plurality of electromagnets to induce a rotation of the flywheel selectively at variable torques and speeds in at least a first direction of rotation entirely through repulsion of the first plurality of permanent magnets by at least one of the first plurality of electromagnets, wherein the rotation of the flywheel is induced by the controller/sequencer performing steps comprising:
1) determining a current speed and position of the flywheel from a set of rotational signals from the means for sensing position of the flywheel;
2) selecting a first selected electromagnet as a first one of the first plurality of electromagnets to energize, a first time in a rotation of the flywheel at which to energize the first selected electromagnet, and a first pulse width at which to energize the first selected electromagnet, wherein the first time is determined to be after passage of a first one of the first plurality of permanent magnets by the first selected electromagnet; and
3) providing a signal to energize the first selected electromagnet at the first time for the first pulse width.

17. The electrically powered land vehicle as recited in claim 16, wherein:
a means for providing a braking signal; and
the steps performed by the controller/sequencer further comprise:
4) in response to receiving the braking signal, selecting a second selected electromagnet as a second one of the first plurality of electromagnets to energize, a second time in a rotation of the flywheel at which to energize the second selected electromagnet, and a second pulse width at which to energize the second selected electromagnet, wherein the second time is determined to be before passage of a second one of the first plurality of permanent magnets by the second selected electromagnet; and
5) providing a signal to energize the second selected electromagnet at the second time for the second pulse width.

18. The electrically powered land vehicle as recited in claim 16, which further comprises:

braking control means whereby the vehicle is slowed by recapture of inertial energy from the flywheel.

19. The electrically powered land vehicle as recited in claim 16, further comprising at least two wheels, each wheel equipped with a radial/rotary propulsion system; and steering means operatively connected to the controller/sequencer whereby the direction of travel of the vehicle is at least partially determined by selective control of each of the two radial/rotary propulsion systems under the control of the controller/sequencer.

20. The electrically powered land vehicle as recited in claim 16 wherein:

a first one of the first plurality of electromagnets has a first resistance and a second one of the first plurality of electromagnets has a second resistance different than the first resistance; and the first one of the first plurality of electromagnets is selected as the first selected electromagnet when a rotational speed of the flywheel is determined to be slower and the second one of the first plurality of electromagnets is selected as the first selected electromagnet when the rotational speed of the flywheel is determined to be faster.

* * * * *